United States Patent
Thorup et al.

(10) Patent No.: US 7,185,104 B1
(45) Date of Patent: *Feb. 27, 2007

(54) METHODS AND SYSTEMS FOR OPTIMIZING NETWORK TRAFFIC

(75) Inventors: Mikkel Thorup, Florence, MA (US); Bernard Fortz, Cortil-Wodon (BE)

(73) Assignee: AT&T Corp., New York, NY (US)

( * ) Notice: Subject to any disclaimer, the term of this patent is extended or adjusted under 35 U.S.C. 154(b) by 363 days.

This patent is subject to a terminal disclaimer.

(21) Appl. No.: 09/633,882

(22) Filed: Aug. 7, 2000

(51) Int. Cl.
*G06F 15/16* (2006.01)
*G06F 15/173* (2006.01)

(52) U.S. Cl. .............. 709/235; 709/224; 709/232; 709/233; 709/241; 345/619; 370/241; 703/22

(58) Field of Classification Search .......... 709/203, 709/223, 226, 238, 240, 249, 224, 230, 232, 709/233, 235, 241; 370/448, 351, 235, 241; 706/15; 345/619; 703/22
See application file for complete search history.

(56) References Cited

U.S. PATENT DOCUMENTS

| | | | | |
|---|---|---|---|---|
| 4,506,361 A | * | 3/1985 | Kume | 370/448 |
| 4,967,345 A | * | 10/1990 | Clarke et al. | 709/241 |
| 5,467,345 A | * | 11/1995 | Cutler et al. | 370/229 |
| 5,533,016 A | * | 7/1996 | Cook et al. | 370/351 |
| 5,729,692 A | * | 3/1998 | Qiu et al. | 709/241 |
| 5,854,903 A | * | 12/1998 | Morrison et al. | 709/249 |
| 6,192,043 B1 | * | 2/2001 | Rochberger | 370/351 |
| 6,359,861 B1 | * | 3/2002 | Sui et al. | 370/230 |
| 6,411,603 B1 | * | 6/2002 | Ahuja et al. | 370/238 |

OTHER PUBLICATIONS

Frigioni et al, "Experimental Analysis of Dynamic Algorithms for the Single Source Shortest Paths Problem", 1998 ACM Press, Article No. 5, pp. 1-3, 5-6.*
Experimental Analysis of Dynamic Algorithms for the Dingle Source Paths Problem; Daniele Frigioni et al.
Annals of Operations Research (Tabu Search); F. Glover et al.
Journal of Algorithms; Goos Kant et al.

* cited by examiner

*Primary Examiner*—Saleh Najjar
*Assistant Examiner*—B R Bruckart

(57) ABSTRACT

The present invention provides methods and systems for evaluating network traffic. By generating successive sets of weights relating to a performance surface using a variety of heuristic techniques, and then evaluating the weights using a piece-wise linear cost function, a number of performance minima can be found. By continuously searching the performance surface, a champion minimum can be extracted. Searching the performance surface can be quickly and efficiently accomplished using a variety functions such as an anti-cycling function, an impatience function, a dynamic graph technique and a diversity process.

25 Claims, 4 Drawing Sheets

METHODS AND SYSTEMS FOR OPTIMIZING NETWORK TRAFFIC

BACKGROUND OF THE INVENTION

1. Field of Invention

This invention relates to methods and systems for optimizing network traffic.

2. Description of Related Art

Modern communications networks transport large volumes of information between various locations in a network. Unfortunately, the traffic across any particular link in a given communications network can represent a formidable volume of information and, as the network transports increasingly more traffic, congestion across various links may cause delays in data delivery.

Presently, most conventional network routing protocols, such as OSPF (Open Shortest Path First), use a shortest path first routing scheme to alleviate network congestion and otherwise manage network traffic. Unfortunately, these protocol systems lack versatility, as the process of changing system weights is often excessively time consuming, and the performance of the resulting traffic flow has been difficult to gauge. Thus, new technology to manage networks is desirable.

SUMMARY OF THE INVENTION

The present invention provides methods and systems for managing and evaluating network traffic. In various embodiments, a technique is provided for evaluating performance weights assigned to the links of a network. By generating successive sets of weights relating to a performance surface using a variety of heuristic techniques, and then evaluating the weights using a piece-wise linear cost function, a number of performance minima can be found. By continuously searching the performance surface, a champion minimum can be extracted. The cost of the champion minimum, as well as the cost for any other set of heuristically generated weights can be compared to the cost generated by an optimal technique to gauge the performance of the heuristic weights.

In various other embodiments, the performance surface can be quickly and efficiently searched using a variety functions such as an anti-cycling function, an impatience function, a dynamic graph technique and a diversity process. Other features and advantages of the present invention are described below and are apparent from the accompanying drawings and from the detailed description which follows.

BRIEF DESCRIPTION OF THE DRAWINGS

The invention is described in detail with reference to the following figures, where like numerals reference like elements, and wherein.

DETAILED DESCRIPTION OF PREFERRED EMBODIMENTS

This application incorporates in its entirety the disclosure of application Ser. No. 09/633,786 "Methods And Systems For Evaluating Network Routing Solutions" to Mikkel Thorup et al filed Aug. 7, 2000.

Shortest Path First (SPF) protocols, such as the Open Shortest Path First (OSPF) protocol and the Intermediate System—Intermediate System (IS—IS) protocol, are the most commonly used techniques for network routing. Generally, the path that an individual data packet takes across a network is determined by various routers directed to routing the data packet across a "shortest path" to the packet's destination. These router's decisions, in turn, are determined in part by a set of weights assigned to each link of the network.

Often these weights of a network are initially set by a network administrator based on the capacity of each link. Accordingly, the "shortest path" does not necessarily refer to the physical distance between two nodes, but can refer alternatively to a combination of qualities other than physical distance such as data capacity, network congestion, various limitations of individual nodes and/or links, specially reserved bandwidth and any other factor than can affect network traffic.

In practical operation, networks tend to form "hot spots", or areas of relative congestion, while other areas go underutilized. To alleviate network congestion, a network operator can adjust the network weights, which will in turn affect individual router decisions. Often a network administrator will adjust weights to reroute traffic along paths that, while physically longer and through less capable routers, will nonetheless tend to alleviate congestion.

Unfortunately, various conventional techniques, such as optimal general routing, suffer from a number of problems, such as requiring excessive computational power. Furthermore, while these "optimal" techniques produce solutions that reflect theoretically ideal solutions, these "perfect" solutions cannot be realized in practice. That is, router protocols such as OSPF and IS—IS cannot use data produced by known optimal techniques. While the term "optimal technique" implies a technique that generates a theoretically best solution, the term "optimal technique" can be construed to apply to any technique that can generate a theoretically optimal, but unrealizable, solution or a technique whose solution would be optimal but for the limitations of practical computing hardware and/or programming techniques.

A heuristic technique, as opposed to an optimal technique, can be any approach that can produce realizable results. Unfortunately, heuristic techniques can also take excessive computational power, and the performance of their realized solutions has been suspect in part by the inability to gauge their performance against the theoretically optimal solutions predicted by optimal routing techniques.

However, by applying a piece-wise linear cost function, as oppose to conventional cost functions, the performance of various heuristic solutions can be easily compared to that of optimal techniques. By further applying a local search technique that uses a modified best-neighbor approach as well as a dynamic graph technique, computational processing is reduced by orders of magnitude.

Figure 1:
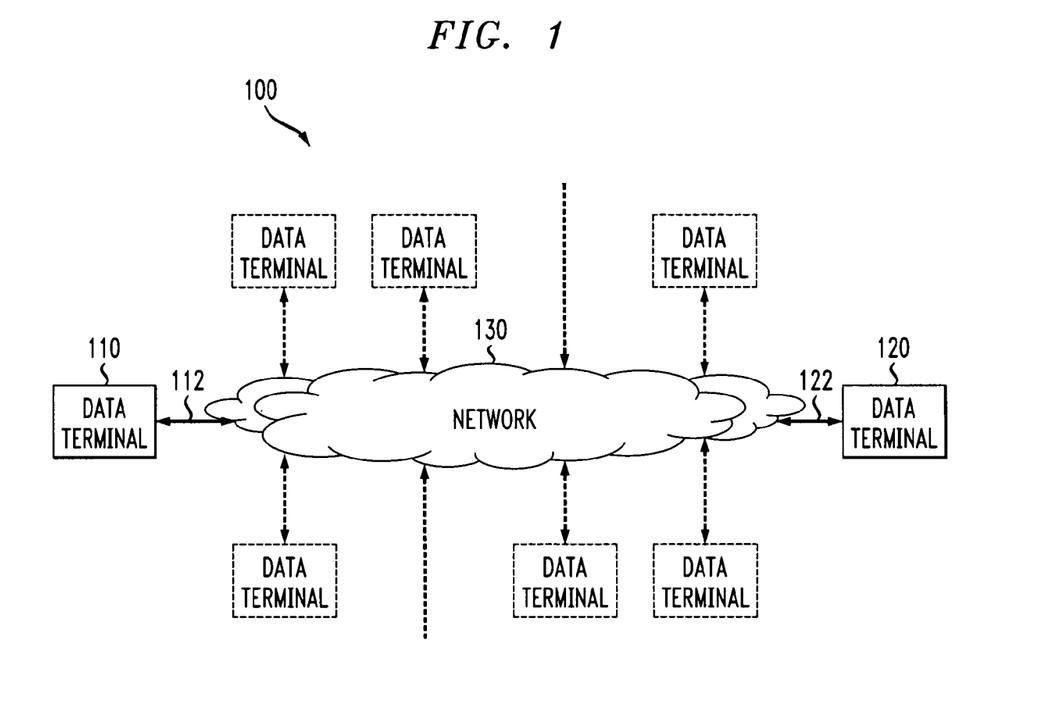
FIG. 1 is a block diagram of an exemplary communications network according to the present invention.

FIG. 1 shows an exemplary block diagram of a communication system 100. The communication system 100 includes a first data terminal 110 connected to a network 130 through a first data link 112, and a second data terminal 120 connected to the network 130 through a second data link 122.

In operation, the data terminals 110 and 120 transmit/receive communication signals to/from the network 130 over their respective links 112 and 122. The network 130 accordingly accommodates communication between the first data terminal 110 and the second data terminal 120 by providing one or more internal communication paths capable of transmitting and receiving communication signals between links 112 and 122, and apportioning data flow between the communication paths. The path formation process starts as the network 130 accesses a weight table (not shown) directed to communication between the links 112 and 122, then directs the communication signals among various internal links (not shown) based on the weights. Accordingly, communication signals can then pass between the links 112 and 122 to establish communication.

The data terminals 110 and 120 can be any one of a number of different types of data terminals, such as computers, routers, SONET terminals, ATM switches, cellular phones, satellites, storage devices, or any combination of software and hardware capable of generating, relaying, recalling from storage any information capable of being transmitted to the network 130. In various exemplary embodiments, the data terminals 110 and 120 can be any number of different types of data receivers capable of receiving digital information such as digital computers, routers, SONET terminals, ATM switches, cellular phones, satellites, storage mediums, transceivers, or any combination of hardware and software capable of receiving, relaying, storing, sensing or perceiving information transmitted from the network 130. In other exemplary embodiments, it should be appreciated that the data terminals 110 and 120 can be elements of the network 130, such as internal routers, ATM switches or any other known or later developed device that can act as an integral part to the network 130.

The links 112 and 122 can be any known or later developed device or system for connecting the data terminals 110 and 120 to the network 130. Such devices include direct serial/parallel cable connections, satellite links, wireless links, connections over a wide area network or a local area network, connections over an intranet, connections over the Internet or connections over any other distributed processing network or system. Additionally, the links 112 and 122 can be software devices linking various software systems. In general, the links 112 and 122 can be any known or later developed connected systems, computer programs or structures usable to connect the data terminals 110 and 120 to the network 130.

Figure 2:
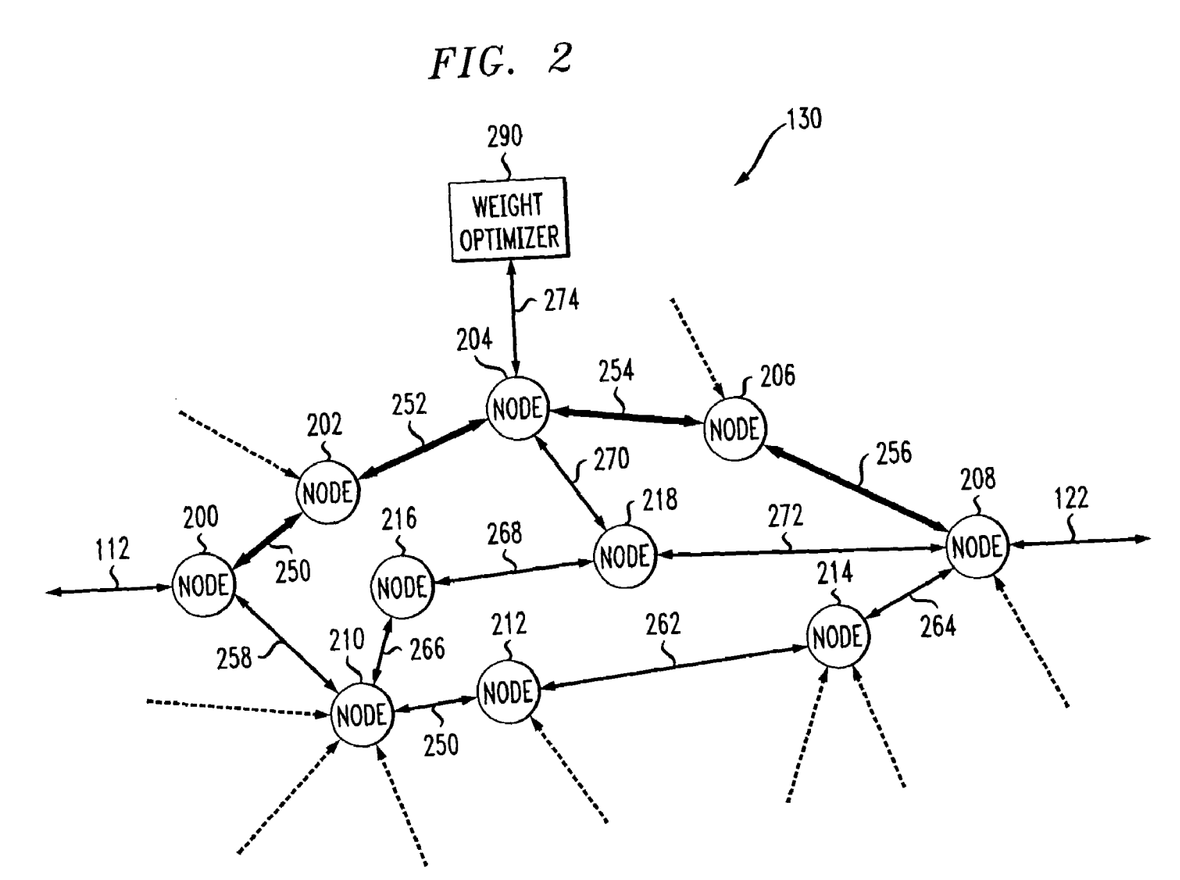
FIG. 2 is a diagram of an exemplary network carrying communication traffic.

FIG. 2 is a block diagram of an exemplary network 130 having a set of communication nodes 200–218 interconnected through a series of transmission lines 250–272, and further connected to a weight optimizer 290 using communication node 204 and link 274. While FIG. 2 depicts a network with ten nodes 200–218, it should be appreciated that the size of a network is not important and networks of any size can be used without departing from the spirit and scope of the present invention.

The communication nodes 200–218 of the exemplary network 130 are capable of passing communication traffic to/from other communication nodes 200–218 via transmission lines 250–272 and to locations external to the network 130, including passing information to/from links 112 and 122 and to/from the weight optimizer 290 via link 274.

In operation, network 130 establishes communication paths to pass communication signals throughout the network 130. The communication signals can be either unidirectional (one way) or bi-directional (two way). A communication path is formed by at least two nodes interconnected by at least one transmission line. In this example, links 112 and 122 can be connected by a first communication path along communication nodes 200–202–204–206–208. The left-hand end-node 200 receives communication signals from a data terminal over link 112, then routes the communication signals directly to node 202 and indirectly to nodes 204, 206 and 208. Similarly, right-hand end-node 208 receives communication signals from a data terminal over link 122, then routes the communication signals directly to node 206 and indirectly to nodes 204, 202 and 200.

While, in the present example, communication signals traveling from link 112 to link 122 traverse the same path as communication signals traveling from link 112 to link 122, it should be appreciated that the particular paths carrying information from link 112 to link 122 can be separate and independent from paths carrying information from link 122 to 112.

Furthermore, while in the present example of FIG. 2, communication signals traveling between links 112 and 122 traverse a single path, it should be appreciated that communication signals such as data packets can be distributed between two or more paths. For example, besides transporting a number of data packets across the first path 200–202–204–206–208, the data packets can be divided with a first portion traveling across path 200–202–204–206–208 and a second portion traveling across a second path 200–210–212–214–208.

In addition to providing communication paths for the external devices, the various communication nodes 200–218 can also transmit and relay status information and commands to each other. For example, node 200 can transmit information to node 208 indirectly through nodes 202, 204 and 206 that node 200 detected a failure in a received communication signal. In response, node 208 can transmit commands to any of the other nodes 202–218 to reroute the user traffic along another path. Furthermore, as shown in FIG. 2, node 204 can pass information from the weight optimizer 290 and distribute the information to the other nodes 200–202 and 206–218, and likewise pass information from the various other nodes 200–202 and 206–218 to the weight optimizer 290. In particular, the various nodes 200–218, can collect information relating to data traffic demands over a particular time period and pass the collected traffic information to the weight optimizer 290. During operation, the various nodes 200–218 can log their activities and periodically provide their logged activities to the weight optimizer 290. The logged activities can then be used to derive data tables of past network traffic flow, which can be stored in the weight optimizer 290. These data tables are known as demand matrices and can be used by the weight optimizer 290 to optimize data flow across the network 130.

While the exemplary weight optimizer 290 is depicted as a device permanently connected to the network 130, it should be appreciated that the weight optimizer 290 can reside in an independent and separate computer-based system such as a personal computer, a server, as part of a router or any other known or later developed system capable of generating weights, without departing from the spirit and scope of the present invention. Consequently, any interface connecting the weight optimizer 290 and the network 130 will change depending on the weight optimizer's form and can accordingly take various forms as required by design preference.

Figure 3:
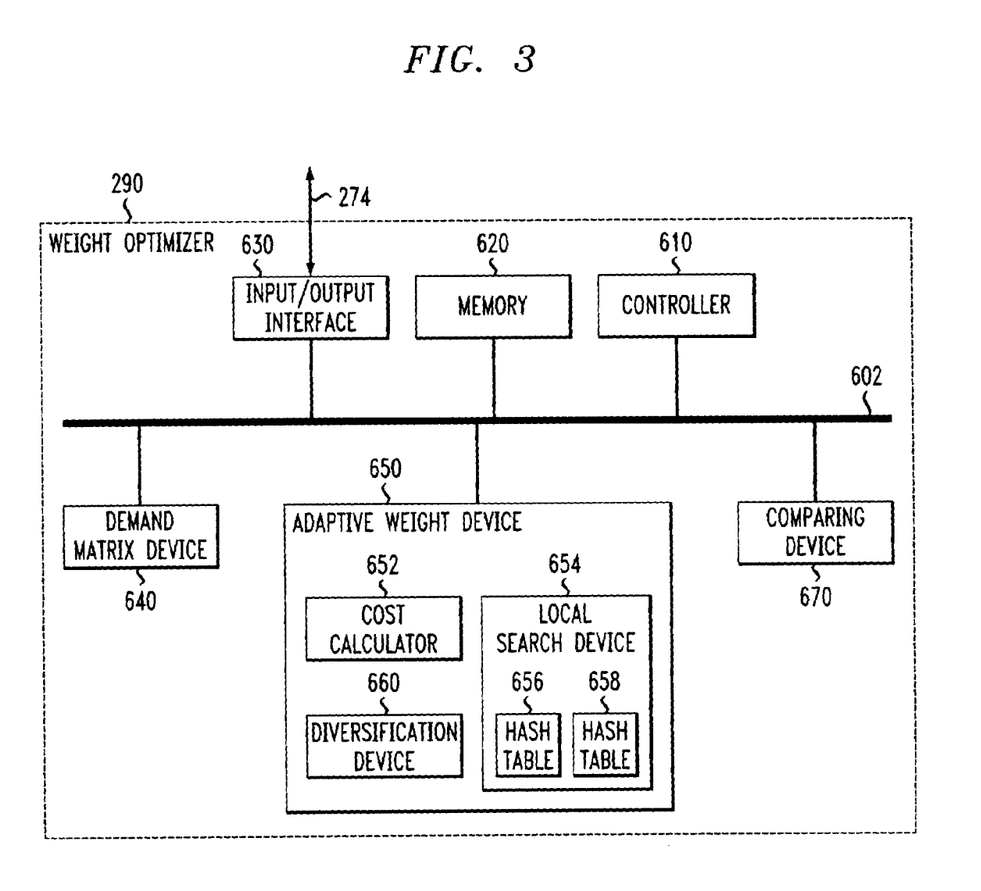
FIG. 3 is a block diagram of an exemplary weight optimizer.
Figure 4:
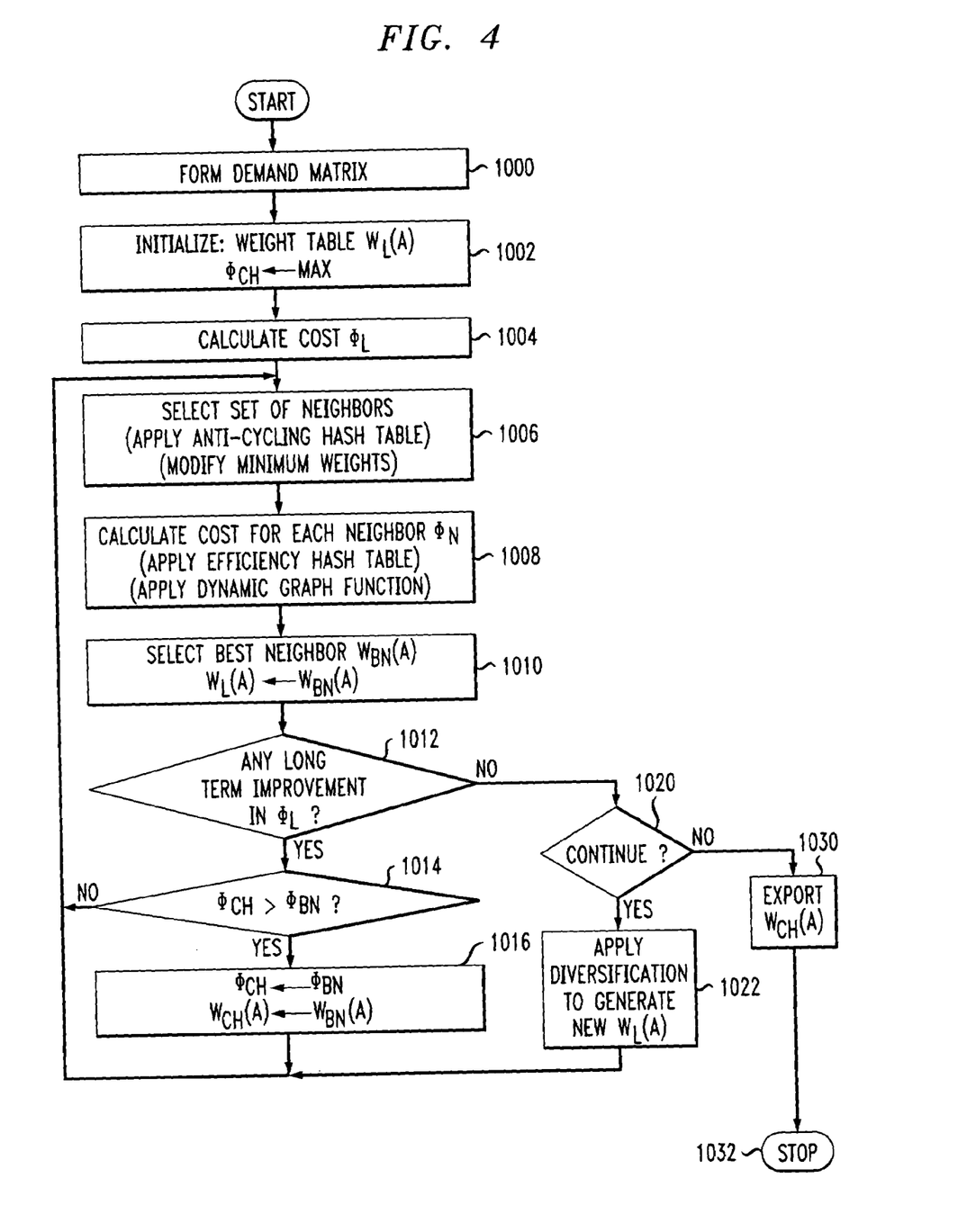
FIG. 4 is a flowchart illustrating an exemplary weight-optimizing technique according to the present invention.

FIG. 3 is a block diagram of an exemplary weight optimizer 290. The weight optimizer 290 includes a controller 610, a memory 620, an input/output interface 630 connected to a network via link 274, a demand matrix device 640, a comparing device 670, and an adaptive weighting device 650, which contains a cost calculator 652, a diversification device 660 and a local search device 654 having a first hash table 656 and a second hash table 658. The above components are coupled together via a data/control bus 602. While FIG. 3 shows a bus architecture, any type of architecture may be used and implemented using any type of technology such as application specific integrated circuits (ASIC), PLAs, PLDs, etc. as is well known to one of ordinary skill in the art. Also, while FIG. 4 shows separate blocks for the input/output interface 630, demand matrix device 640 and adaptive weighting device 650, the functions of these blocks 630–650 may also alternatively be performed by the controller 610.

In operation, as discussed above, the weight optimizer 290 can collect information relating to past traffic histories of a network. Prior to a network optimization process, the controller 610, using the input/output interface 630 and link 274, can retrieve traffic histories from the various nodes of a network and store the traffic history data in the memory 620. Once a sufficient amount of traffic history data is compiled, the controller 610 can pass the traffic history data to the demand matrix device 640 to create one or more demand matrices. Such demand matrices can be represented by a two-dimensional array D(s,d), where s represents a particular source node, d represents a particular destination node and each entry D(s,d) contains a value representing the network demand of data traveling from source s to destination d.

In various exemplary embodiments, a demand matrix can represent all network demand over a prolonged time period. In other exemplary embodiments, a number of demand matrices can be compiled from data over the same time period with each demand matrix reflecting demand from different periods within the prolonged time period. That is, it may be desirable to have a demand matrix for each time period $D_1, D_2, \ldots D_N$ where $D_i$ is a demand matrix associated with time period i and N is the total number of separate demand matrices. For example, traffic data for a twenty-four hour period can be compiled to create a single demand matrix, or the traffic data can be divided into twenty-four separate hour-long bins to create twenty-four separate demand matrices, which can generally track the traffic peaks and lulls over the day.

In still other various embodiments, the various demand matrices may further incorporate non-performance information such as a service level agreement (SLA) with network customers. An SLA is a guarantee made by the network providers to the customer guaranteeing that a certain bandwidth will be available with certain data delivery speeds. By optimizing the weights with a demand matrix that accounts for SLAs, the optimization process may guarantee a group of customers a minimum level of services, as well as provide spare bandwidth for newly added customers.

After a desired demand matrices has been compiled, the demand matrix device 640 provides the desired demand matrix to the adaptive weighting device 650. The adaptive weighting device 650 receives the demand matrix, and initializes a complimentary set of weights W(A) for all the respective links of a network A. Each weight w(a)∈W(A) relates to a respective link a and generally represents the data capacity of the link a. For the exemplary network 130 of FIG. 2, W(A) includes weights for each link 250–272 such that W(A)={w(250), w(252), ... w(272)}. To initialize the weights, the exemplary adaptive weighting device 650 assigns each weight based on the data capacity of each link 250–272. However, as discussed above, initial weights can be based on a large number of criteria including physical distance, network congestion, limitations of individual nodes and/or links, specially reserved bandwidth and any other factor relating to the performance of a network without departing from the spirit and scope of the present invention.

Once the initial weights are determined, the adaptive weighting device 650 applies the weights W(A) and the desired demand matrix D(s,d) to calculate the traffic load on each link of the network. Details on calculating traffic loads can be found in at least Thorup, Mikkel and Fortz, Bernard, "Internet Traffic Engineering by Optimizing OSPF Weights", *Proceedings of the IEEE conference on information communications (INFOCOM)*, (March 2000) incorporated in its entirety herein by reference. Once the various traffic loads are determined, the cost calculator 652 can evaluate the performance of the network using a cost function according to Eq. (1):

$$\Phi = \sum_{a \in A} \Phi_a(l(a)) \qquad (1)$$

where link a is an element of network A, l(a) is the load on link a, and $\Phi_a$ is the cost function for link a. The load l(a) is a normalized quantity where $l(a)=x_a/c(a)$, $x_a$ is the amount of traffic flow on link a, and c(a) is the capacity of link a.

A cost function is a method for measuring the performance of different sizes and topologies of networks under a particular demand, and is a function of the weights W(A) and demand matrix D(s,d). Generally, the cost function evaluates performance by rewarding minimum bandwidth use for each network link and by heavily penalizing excessive bandwidth use for each link. For example, if traffic across all of the links of a network are light compared to the capacity of the links, the reflected total costs are light. However, if traffic across the links are inefficiently routed, significant time delays can occur due to traffic overloads over various links. Accordingly, the cost function for the overloaded links should be large.

The particular form that the exemplary cost function $\Phi_a$ takes is a piece-wise linear function, and can be described by its first derivative $\Phi'_a$ according to general form of Eq. (2):

$$\Phi'_a(x) = \begin{cases} 1 & \text{if } x \in [0, 1/3\ c(a)[; \\ 3 & \text{if } x \in [1/3\ c(a), 2/3\ c(a)[; \\ 10 & \text{if } x \in [2/3\ c(a), c(a)[; \\ 100 & \text{if } x \in [c(a), \infty[. \end{cases} \qquad (2)$$

where $x_a$ is the expected traffic across link a, c(a) is the capacity of link a, and the first derivative $\Phi'_a$ is expressed for various ranges of the traffic $x_a$ against capacity c(a). As shown by Eq. (2), small loads across a link will result in low costs. As loads increase across the link, the cost increases, and as loads increase to exceeds the capacity c(a), the cost will reflect a heavy penalty. For example, for a link operating according to Eqs. (1) and (2) and capable of transmitting one million bits-per-second, i.e., c(a)=1,000,000, if the traffic $x_a$ is one thousand bits-per-second, the load $l(a)=x_a/c(a)=1,000/1,000,000=0.001$ and the respective cost will be $\Phi_a=$ $(0.001\times(1/3-0))=0.00033$. If the traffic increases to 800,000 million bits-per-second, $l(a)=x_a/c(a)=800,000/1,000,000=0.8$ and the respective cost will be $\Phi_a=(1\times(1/3-0))+(3\times(2/3-1/3))+(10\times(0.8-2/3))=1/3+3/3+4/3=8/3$. If the traffic still further increases to 1,200,000 million bits-per-second, $l(a)=x_a/c(a)=1,200,000/1,000,000=1.2$ and the respective cost will be $\Phi_a=(1\times(1/3-0))+(3\times(2/3-1/3))+(10\times(1.0-2/3))+(100\times(1.2-1.0))=1/3+3/3+10/3+20=24.67$.

It should be appreciated that Eq. (2) represents a single possible embodiment of a cost function. Accordingly, in other embodiments, it should be appreciated that $\Phi_a$ can be any linear or piece-wise linear function representing a non-decreasing and/or substantially convex function, i.e., the second derivative $\Phi''_a$ should generally be non-negative. Further details about cost functions can be found in at least Thorup, Mikkel and Fortz, Bernard, "Internet Traffic Engineering by Optimizing OSPF Weights", *Proceedings of the IEEE conference on information communications (INFOCOM)*, (March 2000).

As discussed above, optimal techniques suffer from a number of problems, such as requiring excessive computational power and providing results that, while reflecting theoretically ideal solutions, are nonetheless non-realizable by real-world router protocols such as OSPF and IS—IS. On the other hand, heuristic techniques can produce realizable solutions, but there is no known way to gauge their performance and no way to compare their performance to theoretically optimal solutions using conventional techniques.

However, by applying a piece-wise linear cost function to various heuristic techniques, including local search techniques, a network administrator can directly compare their performance against the theoretical optimal benchmarks. Accordingly, piece-wise linear cost functions can provide a tool to evaluate or otherwise measure heuristic solutions against theoretically optimal solutions.

While the exemplary cost function uses a piece-wise linear cost function to develop solutions and gauge their performance, it should be appreciated that, in various other embodiments, other cost functions such as polynomial-based cost functions, non-linear cost functions or any other known or later developed cost functions can alternatively be used, with varying success, to develop network weights.

Once the initial loads and respective cost are determined, the adaptive weighting device 650 applies the local search device 654 to the weights W(A) to modify the weights according to various search techniques.

To understand the basics of the search process, it should first be understood that networks such as the network of FIG. 2, can be modeled by a performance surface. Conceptually, a performance surface can be described in terms of a multidimensional surface having a number of hills (maxima) and depressions (minima). Each weight w(a) can be considered an vector such that the set of weights W(A) act as a coordinate system pointing to any point on the performance surface. The cost function $\Phi$ will accordingly relate to the elevation (cost) at the particular point on the performance surface pointed to by W(A). Generally, a minimum, also called a local optimum, represents a favorable solution and the lowest minimum on the performance surface, called the global minimum or global optima, is the best solution. Accordingly, it should be appreciated that locating the various minimum will provide advantageous sets of weights for a network, and that locating the global minimum will provide the optimal network weights.

It should further be understood that the performance surface can be divided into various separate regions called performance regions. Each performance region can be conceptualized as an area surrounding a particular minimum such that a descent technique applied at any point within the performance region will find the respective minimum. Accordingly, any set of weights pointing to another performance region relating to another minimum will not adapt to the first minimum, but will adapt to the other minimum.

Generally, a local search technique is any approach that, for a given vector W(A), considers only those neighboring states closely surrounding W(A) and steps to one of those neighboring states. Each state allowable point immediately surrounding a vector W(A) is referred to as a "neighbor" or "neighboring state" of W(A) and each "adaptation step" from W(A) will generally progress to one of its neighboring states.

A descent approach is a form of local search and can be further defined as any approach that searches for a minimum by searching for one or more available neighboring states about a vector W(A), evaluates the cost of the neighboring states and adapts to one of the neighboring states that reflects a lower cost than vector W(A). A steepest-descent approach, like a descent approach, seeks "lower ground". However, a steepest-descent approach is distinguished in that, for each adaptation step, the steepest-descent approach will move from W(A) to the neighboring state that reflects the lowest cost. Accordingly, a steepest-descent approach will adapt to a minimum faster than a non-steepest-descent approach.

Local search techniques, such as a descent or steepest-descent approach, can act much as a liquid flowing from a given starting point within a performance region downhill to a local minimum, where it will remain unless otherwise disturbed.

A variation of the steepest-descent approach is the "best-neighbor" approach. A best-neighbor approach, like a steepest-descent approach, will search for the neighboring state having the best, i.e. lowest, cost. However, unlike the steepest-descent approach, the best-neighbor approach is not limited to moving downhill on a performance surface, but can alternatively move to neighboring states reflecting an equal or even higher costs. The best-neighbor approach provides an advantage over the steepest-descent approach in that, while both the steepest-descent and best-neighbor approach will both seek a minimum, once the minimum has been located, a best-neighbor approach, with various modifications, can escape the minimum into a another performance region. Once inside the next performance region, the best-neighbor approach can find the corresponding minimum, and so on. Such a modified best-neighbor approach can theoretically "meander" about a performance surface to visit various minima and log the location and respective cost of each minimum encountered to provide a champion minimum.

As mentioned above, a best-neighbor approach should be modified to precluded cycling between previously visited states. A first useful modification to the best-neighbor approach is to apply an "impatience" mechanism. That is, it can be desirable to track states on the performance surface that have been previously evaluated, and preclude the local search device 654 from further considering these previously evaluated states. By this manner, as the local search device 654 searches a minimum and the various states in the minimum are continually evaluated, the pool of states that can be subsequently evaluated shrinks until the number of searchable states becomes so small that the local search device 654 effectively becomes "impatient" and is compelled to leave the minimum for lack of searchable states.

The exemplary local search device 654 implements an impatience mechanism using the first hash table 656 to log previously evaluated neighboring states. That is, for any set of weights W(A), if a particular neighboring state $W_N(A)$ has been previously calculated, $W_N(A)$ can be stored. Accordingly, if the same neighboring state $W_N(A)$ is subsequently generated, the local search device 654, upon finding that a duplicate $W_N(A)$ was previously examined, discards $W_N(A)$ without further consideration.

In various embodiments, the first hash table 656 resets the first hash table 656 for every new set of weights W(A). However, in other various embodiments, it can be desirable to maintain the first hash table 656 for any number of evaluated states, such as maintaining the evaluated states for the last five values of W(A). In still other embodiments, the first hash table 656 is never reset or reset only when a new performance region is found. While the exemplary local search device 654 uses the first hash table 656 to implement an impatience mechanism, it should be appreciated that any device that can maintain a list of past evaluated states and recall these evaluated states can be used without departing from the spirit and scope of the present invention.

Another useful modification to a best-neighbor approach is to apply an anti-cycling mechanism. That is, it can be desirable to track the past states that the local search device 654 has stepped through, and preclude the local search device 654 from adapting to any state it has previously visited. This modification will preclude a best-neighbor process from "cycling" among a number of states at the bottom of a minimum, and ideally force the weights W(A) away from the minimum. As with the first hash table 656, while the exemplary local search device 654 uses the second hash table 658 to implement an anti-cycling mechanism, it should be appreciated that any device that can abate or preclude cycling can be used without departing from the spirit and scope of the present invention.

The exemplary local search device 654 implements anti-cycling using the second hash table 658 to log and recall previously visited states. The second hash table 658 effectively acts as a short-term memory allowing the local search device 654 to completely eliminate cycling and allow for a more robust search of the performance surface.

Despite the benefits of various modifications, a modified best-neighbor approach may not always escape every minimum easily. For example, various minima can be compared to long valleys. In such cases, while the modified best-neighbor approach can theoretically escape such a minimum, the processing time can become unnecessarily impractical as the modified best-neighbor approach meanders back and forth along the length of the minimum. When these or like circumstances arise, the modified best-neighbor approach can be further complimented by a diversification process.

A diversification process does not adapt step by step as do local search techniques, but rather reassigns, or "shakes", the weights in W(A) to point to other performance regions on the performance surface. In variously exemplary embodiments, the local search device 654 performs diversification by applying a random or pseudo-random vector generator to find new performance regions. However, it should be appreciated that any combination of known or later developed techniques capable of generating weight sets that can point to various performance regions can be used without departing from the spirit and scope of the present invention.

In other exemplary embodiments, the local search device 654 performs a limited-range diversification process by generating limited-range vectors, which will shake the weights of W(A) only to a vector $W_\delta(A)$ that exists within a predetermined radius $\delta$ of W(A) such that $\delta > |W_\delta(A) - W(A)|$. Assuming that the past work of a local search has adapted W(A) a favorable low-cost area on the performance surface, limiting the diversification process to such local jumps takes advantage of the previous work while shaking the weights from the immediate problematic performance region.

Once outside the immediate performance region, a local search technique can again be applied to find the next minimum in the next performance region. The process of cycling between local search and heuristic search techniques can continue until the best possible solution, or an otherwise satisfactory solution is found.

Returning to the operation of the adaptive weighting device 650, as mentioned above, the local search device 654 can apply a local search technique to the weights W(A) such as by example a descent, steepest-descent, best-neighbor or modified best-neighbor approach to seek a first minimum in a first performance domain.

In various exemplary embodiments, the local search device 654 uses a local search technique that modifies a single weight at a time. For example, for a network having one-hundred links with respective weights, given the search device 654 can change a single weight $w(a) \in W(A)$ to one five predetermined or random values, W(A) can progress to one of five-hundred neighboring states.

In other various embodiments, the local search device 654 uses a local search technique to modify the weights for a number of links in a fashion designed to enforce evenly balanced data flows. That is, for communication signals traveling from various source nodes to a particular destination node d, if any such communication signals travel through a particular node x, it is desirable to apportion the total communication signals leaving node x evenly among the links leaving node x. Intuitively, an evenly balanced flow technique redirects traffic flow around one or more particular links about a node while simultaneously enforcing the balance of the total data flow about the node.

By adjusting link weights either one at a time, or according to any techniques directed to enforce even data flows, it should be recognized that these approaches will change only a very few weights. These approaches, as well as any other approach that changes a small number of weights, will consequently affect the loads across a proportionately small numbers of links. An important consequence of this is that, after a first cost $\Phi_1$ for a first set of weights $W_1(A)$ has been calculated, an updated cost $\Phi_2$ relating to an updated set of weights $W_2(A)$ can reuse the great majority of load information generated for the first cost $\Phi_1$, and a dynamic graph technique can be applied.

A dynamic graph technique takes advantage of the result that, when only a small number of weights are changed, most of the earlier computed cost information relating to a previous cost function can be reused. The resulting benefit of using a dynamic graph technique after a small number of weight changes is that the speed of computing the new cost $\Phi_2$ can improve on the order of twenty to one-hundred times over conventional methods.

Dynamic graph techniques for efficiently using precomputed information can be found can be found in at least Thorup, Mikkel and Fortz, Bernard, "Internet Traffic Engineering by Optimizing OSPF Weights", *Proceedings of the IEEE conference on information communications (INFO-COM)*, (March 2000); and further found in Ramalingham, G. and Reps, T, "An incremental algorithm for a generalization of the shortest-path problem", *Journal of Algorithms*, vol. 21, no. 2, pp. 267–305 (1996) and Frigioni, D. et. Al., "Experimental analysis of dynamic algorithms for the single-source shortest path problem", *ACM Journal of Experimental Algorithmics*, vol. 3, article 5 (1998) both incorporated in their entirety herein by reference.

While the exemplary local search device 654 changes a few weights at a time according to the various exemplary strategies, it should be appreciated that any technique directed to changing a few weights at a time that can subsequently enable the use of a dynamic graph function can alternatively be used. It should further be appreciated that, in other exemplary techniques, various other local search techniques directed to changing any number of weights can be used, with notice that, as the number of weight changes increase, the efficiency gained by the dynamic function can decrease.

To improve search speed, the local search device 654 can perform a rarefied neighborhood search. That is, for a given set of weights W(A) having N number of available neighboring states, the local search device 654 can explore a subset of the available neighboring states. For example, by variably exploring between 1% and 20% of all possible neighboring states, and adapting toward the best solution of one of the explored neighboring states, a reasonable facsimile of a steepest descent or best-neighbor approach can be had. While such facsimiles would generally take more steps to reach a given minimum, the processing requirements of each step is greatly reduced to provide a net improvement in processing.

Returning to the basic operation of the adaptive weighting device 650, as the local search device 654 applies its local search technique to the weights W(A), the local search technique will descend to a local minimum. In various embodiments, the local search device 654 can then log the minimum and apply a diversification process point the weights to another performance region, where the local search device 654 can again apply a local search technique to the next performance region, and so on. As the local search device 654 explores each minimum, it can log the best solution, or champion, encountered throughout its exploration. If a new solution with a lower cost is encountered, the new solution becomes the champion. The process between cycling between a local search technique and a diversification process can continue until the best possible solution, or an otherwise satisfactory solution is found.

In other exemplary embodiments, the local search device 654 searches for a champion by applying a modified best-neighbor approach. The modified best-neighbor approach can provide the local search device 654 with an alternative to finding the various minimum by using a diversification process, or a modified best-neighbor approach can be used in combination with a diversification process. Again, as discussed above, the process between cycling between a best-neighbor approach and a diversification process can continue until the best possible solution, or an otherwise satisfactory champion solution is found.

After the champion set of weights is found, this champion which can represent the champion minimum, i.e., the best performing solution discovered, which can be exported by the adaptive weight device 650 to the respective network using input/output interface 630 and link 274.

In various exemplary embodiments the adaptive weight device 650 can also generate an optimal solution and further generate the optimal solution's respective cost according to Eqs. (1) and (2). The adaptive weight device 650 can then export the optimal cost as well as the respective cost for the champion weights to the comparing device 670. The comparing device 670 can then compare, measure or otherwise evaluate the heuristic solution and export the results to a network administrator using input/output interface 630 and link 274.

FIG. 4 is a flowchart illustrating an exemplary weight-optimizing technique according to the present invention. The process starts in step 1000 where a demand matrix relating to a network is formed. Next, in step 1002, a number of variables is initialized including a set of weights $W_L(A)$ relating to the links of the network. Furthermore, a champion cost $\Phi_{CH}$ is initialized to a high number that is a practical maximum value obtainable by a cost function. Then, in step 1004, a cost $\Phi_L$ relating to the weights $W_L(A)$ is calculated. The process continues to step 1006.

In step 1006, a subset, or rarefied set of neighboring states of $W_L(A)$ is selected. In various embodiments, to avoid cycling problems, an anti-cycling mechanism can be applied to preclude consideration of states that have been previously visited. While the exemplary anti-cycling mechanism uses a hash table, any other known or later developed device that can be used to prevent cycling can alternatively be used without departing from the spirit and scope of the invention.

In various other exemplary embodiments, an impatience mechanism is implemented to preclude consideration of those neighboring states that, while not previously visited, have otherwise been previously evaluated. While the exemplary impatience mechanism uses another hash table, any other known or later developed device that can be used to preclude consideration of previously evaluated states can alternatively be used without departing from the spirit and scope of the invention.

In still various other exemplary embodiments, it should be appreciated that approaches that change a single weight at a time, that change a small number of weights directed to enforcing an evenly balanced flows of traffic, or any other known or later developed technique directed to changing a small number of weights to enable use of a dynamic graph function can be used. In other exemplary embodiments, it should be appreciated that other techniques directed to changing a variety of weights according to any known or later developed technique useable to modify network weights can alternatively be used without departing from the spirit and scope of the invention. The process continues to step 1008.

In step 1008, each new cost $\Phi_N$ relating to each neighboring state generated in step 1006 is calculated. As discussed above, in various exemplary embodiments, each cost can be calculated according to Eq. (1) above, using a suitable piece-wise linear cost function. Furthermore, in various other embodiments, a hash table or other suitable device can be applied to avoid calculating previously calculated costs. In still other various embodiments, a dynamic graph function can be applied to avoid duplicate processing. The process continues to step 1010.

In step 1010, a local search technique is applied to select a set of best neighboring weights $W_{BN}(A)$. and the local search technique steps from $W_L(A)$ to $W_{BN}(A)$. While the exemplary local search technique uses modified best-neighbor approach, it should be appreciated that any technique useable to provide a local search such as a descent approach, a steepest-descent approach or any other known or later developed approach capable of providing a local search useable to locate minima on a performance surface can be used, without departing from the spirit and scope of the invention.

In step 1012, a determination is made as to whether there has been any long-term improvement in the costs $\Phi_L$. If the cost $\Phi_L$ shows improvement, control continues to step 1014; otherwise, control jumps to step 1020.

In step 1014, a determination is made as to whether the best new cost $\Phi_{BN}$ relating to $W_{BN}(A)$ is less than the champion cost $\Phi_{CH}$. If the best new cost $\Phi_{BN}$ is less than the champion cost $\Phi_{CH}$, control continues to step 1016; otherwise, control jumps back to step 1006, where a next set of neighbors relating to the new $W_L(A)$ is selected. Control then jumps back to step 1006, where a next set of neighbors relating to the new $W_L(A)$ is selected.

In step 1020, because no long term improvement was found in step 1012, another determination is made as to whether to continue exploring the performance surface. If exploration is to continue, control continues to step 1022; otherwise, control continues to step 1030.

In step 1022, a diversification process is applied to shake the system weights $W_L(A)$ into another performance domain. While the exemplary diversification process is a limited-range diversification process using a random vector generator to generate the new $W_L(A)$, it should be appreciated that any other known or later developed technique useable to generate weights that point to various performance domains on a performance surface can be used, without departing from the spirit and scope of the invention. Control then jumps back to step 1006, where a next set of neighbors relating to the new $W_L(A)$ is selected.

In step 1030, because a decision was made to not continue exploration, the champion minimum $W_{CH}(A)$ is exported, and the process stops in step 1032.

As shown in FIG. 3, the methods of this invention are preferably implemented using a general purpose computer such as a personal computer with peripheral integrated circuit elements and dedicated communication hardware. However, the weight optimizer 290 can be implemented using any combination of one or more programmed special purpose computers, programmed microprocessors or microcontrollers and peripheral integrated circuit elements, ASIC or other integrated circuits, digital signal processors, hardwired electronic or logic circuits such as discrete element circuits, programmable logic devices such as a PLD, PLA, FPGA or PAL, or the like. In general, any device capable of implementing a finite state machine that is in turn capable of implementing the flowcharts shown in FIG. 4 can be used to implement the weight optimizer 290.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. Thus, there are changes that may be made without departing from the spirit and scope of the invention.

What is claimed is:

1. A method for controlling traffic flow in a network, comprising:
   generating a set of control weights for a respective set of links of the network, from a given network load and a cost function, where the set of control weights begins with a starting set of control weights and iteratively is modified based on the cost function, and the iterative modifying is carried out in accord with a best-neighbor approach that is other than a steepest descent algorithm; and
   controlling traffic flow in the network using the set of control weights in decisions relative to links of the network that are to be used for the transmission of packets.

2. The method of claim 1, wherein the best-neighbor approach is a modified a best-neighbor approach that uses at least an anti-cycling technique.

3. The method of claim 2, wherein the best-neighbor approach is a modified the best-neighbor approach that uses at least an impatience technique.

4. The method of claim 3, wherein generating the set of control weights is further based on at least a diversification process.

5. The method of claim 4, wherein the diversification process is a limited-range diversification process.

6. The method of claim 3, wherein generating a set of control weights is further based on a piece-wise linear cost function.

7. The method of claim 1, wherein the best-neighbor approach is a modified best-neighbor approach that uses an impatience technique.

8. The method of claim 7, wherein generating the set of control weights includes:
   evaluating a first traffic cost based an existing set of weights;
   generating a computed set of weights based on the existing set of weights and the best-neighbor approach;
   evaluating a second traffic cost relative to the computed set of weights;
   if the second traffic cost is lower than the first traffic cost, declaring the computed set of weights to be the existing set of weights and the second traffic cost to be the first traffic cost;
   if a preselected cost criterion has not been met, returning to said step of generating; and
   if the preselected cost criterion has been met, setting weights to correspond to the computed set of weights.

9. The method of claim 8, wherein generating the set of second weights is further based on at least a rarefied neighborhood search.

10. The method of claim 8, wherein generating the set of second weights is further based on a dynamic graph technique.

11. The method of claim 1, wherein generating the set of control weights is further based on a diversification process.

12. The method of claim 11, wherein the diversification process is a limited-range diversification process.

13. An apparatus for controlling traffic flow in a network, comprising:
   a weight device that generates a set of control weights, one for each link of the network, based on a best-neighbor approach that is other than a steepest descent algorithm; and
   at least one network node that receives one or more control weights of the set of control weights, and controls traffic flow in the network based at least the one or more control weights.

14. The method of claim 13, wherein best-neighbor approach is a modified best-neighbor approach that uses at least one of an anti-cycling mechanism and an impatience mechanism.

15. The apparatus of claim 14, wherein best-neighbor approach is a modified best-neighbor approach that uses at least an anti-cycling mechanism and an impatience mechanism.

16. The apparatus of claim 15, wherein the weight device includes a diversification device that performs at least one diversification process.

17. The apparatus of claim 13, wherein the weight device includes a diversification device that performs at least one diversification process.

18. The apparatus of claim 17, wherein the diversification process is a limited-range diversification process.

19. The apparatus of claim 17, wherein the weight device includes a cost calculator that calculates at least the cost of at least one control weight of the set of control weights based on a piece-wise linear cost function having two or more segments.

20. A method for controlling traffic flow in a network having N interconnected links, where N is an integer, comprising:

selecting a control weight for each of said N links by considering an N-dimensional concave cost function of traffic load on each of said N links that is related to said weights, said selecting being adapted to accept a set of control weights that corresponds to a point on said multidimensional cost function that is or approaches a local minimum, where said point is selected by means of a best-neighbor algorithm; and controlling traffic flow in the network using the set of control weights.

21. The method of claim 20 where the cost function is piecewise linear.

22. The method of claim 20 where the cost function is convex.

23. The method of claim 20 where the a second derivative of the cost function is non-negative.

24. A method for controlling traffic flow in a network having N interconnected links, where N is an integer, comprising:

selecting a control weight for each of said N links by considering an N-dimensional cost function of traffic load on each of said N links that is related to said weights, said selecting being adapted to accept a set of control weights that corresponds to a point on said multidimensional cost function that is or approaches a local minimum where the point is selected by cycling through a local search technique and a heuristic technique that moves a potential solution point to outside a neighborhood of the local search; and controlling traffic flow in the network using the set of control weights.

25. The method of claim 24, wherein the heuristic is a limited-range diversification process.

* * * * *